United States Patent
Singh et al.

(10) Patent No.: US 8,056,429 B2
(45) Date of Patent: Nov. 15, 2011

(54) MULTI-SPEED DUAL CLUTCH TRANSMISSION WITH COUNTERSHAFT GEARING ARRANGEMENT

(75) Inventors: Tejinder Singh, Canton, MI (US); Henryk Sowul, Oxford, MI (US); James D. Hendrickson, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 895 days.

(21) Appl. No.: 12/061,370

(22) Filed: Apr. 2, 2008

(65) Prior Publication Data

US 2009/0249907 A1   Oct. 8, 2009

(51) Int. Cl.
*F16H 3/08* (2006.01)

(52) U.S. Cl. ........................................................ 74/330

(58) Field of Classification Search .................. None
See application file for complete search history.

(56) References Cited

U.S. PATENT DOCUMENTS

| 6,209,407 B1* | 4/2001 | Heinzel et al. ................. 74/331 |
| 2005/0000307 A1* | 1/2005 | Gumpoltsberger ............. 74/331 |
| 2007/0214906 A1* | 9/2007 | Fahland et al. ................. 74/340 |

FOREIGN PATENT DOCUMENTS

DE    10316070 A1    10/2003

* cited by examiner

*Primary Examiner* — David D Le
*Assistant Examiner* — Erin D Bishop

(57) ABSTRACT

A transmission is provided having a dual clutch to achieve torque flow through a dual countershaft gearing arrangement. The countershaft gearing arrangement includes a plurality of co-planar gear sets having gears that are selectively connectable to a first countershaft and a second countershaft. A transfer gear set transfers torque from the countershafts to an output shaft.

20 Claims, 1 Drawing Sheet

MULTI-SPEED DUAL CLUTCH TRANSMISSION WITH COUNTERSHAFT GEARING ARRANGEMENT

TECHNICAL FIELD

The present disclosure relates to transmissions, and more particularly to a multiple speed transmission having a dual clutch assembly and dual countershafts.

BACKGROUND

A typical multi-speed, dual clutch transmission uses a combination of two friction clutches and several torque transmitting devices to achieve "power-on" or dynamic shifts by alternating between one friction clutch and the other, with the torque transmitting devices being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

The addition of clutches, brakes, and gear sets to achieve these gear ratios and torque ranges may result in inefficient or undesirable transmission weights and sizes. Accordingly, there is a need in the art for a transmission having improved packaging while providing desirable gear ratios and torque ranges.

SUMMARY

In one aspect of the present invention, a powertrain having a transmission input member, a power source for generating a torque in the input member, a first interconnecting shaft, a second interconnecting shaft concentric with the first interconnecting shaft, a dual clutch, a pair of countershafts, a first and second set of gears, an output shaft and a first transfer gear is provided. The dual clutch is selectively engageable to couple the transmission input member with one of the first and second interconnecting shafts. The first set of gears are connected for common rotation with one of the first and second interconnecting shafts and intermesh with a second and third set of gears to form a plurality of co-planar gear sets. Each of the gear sets are connectable for common rotation with the countershafts for selectively transferring the torque to the countershafts when the dual clutch is engaged. The output shaft is disposed radially outward of the second interconnecting shaft. The first transfer gear is coupled to the countershafts for transferring torque from the countershafts to the output shaft.

The above features and advantages and other features and advantages of the present invention are readily apparent from the following detailed description of the best modes for carrying out the invention when taken in connection with the accompanying drawings.

DESCRIPTION

Figure 1:
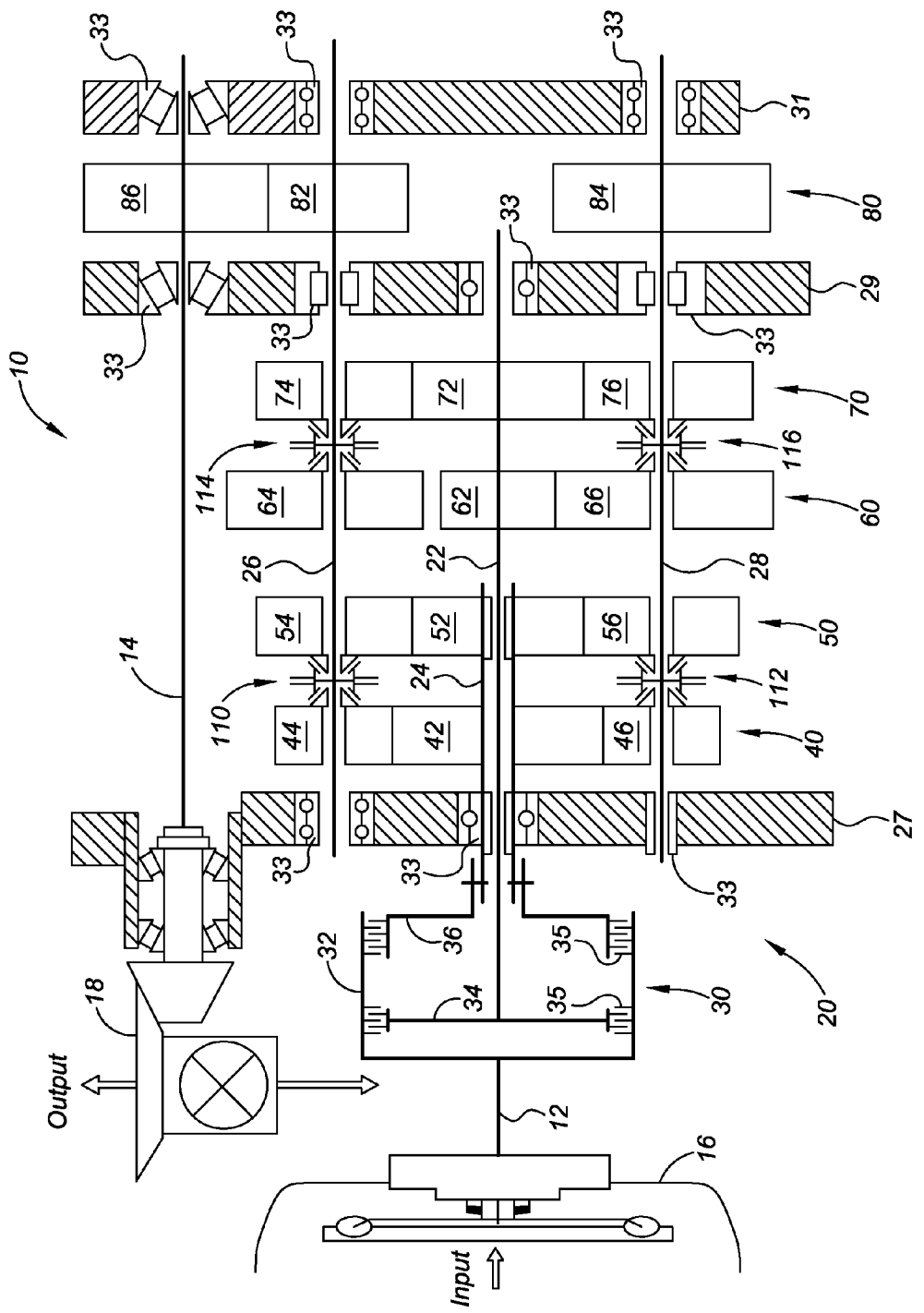
FIG. 1 is a schematic representation of an embodiment of a transmission in accordance with the present invention.

Referring to the drawings, wherein like reference numbers refer to like components, in FIG. 1 a multiple speed transmission is generally indicated by reference number 10. The transmission 10 includes an input member 12 and output member 14. In the present embodiment, the input member 12 and the output member 14 are shafts, however those skilled in the art will appreciate that the input and output members 12, 14 may be components other than shafts. The input member 12 is continuously connected with a torque converter 16 or other starting device. An engine (not shown) is connected to and provides a driving torque to the torque converter 16. The output member 14 is continuously connected with a final drive unit 18. The transmission 10 includes a countershaft gearing arrangement 20 that includes interconnecting shafts, countershafts, co-planar intermeshing gear sets and selectively engageable synchronizers as will be described herein. For example, the countershaft gearing arrangement 20 includes a first interconnecting shaft or member 22 and a second interconnecting shaft or member 24, which is preferably a sleeve shaft concentric with the first interconnecting shaft 22. The countershaft gearing arrangement 20 further includes a first countershaft 26 and a second countershaft 28. The countershafts 26 and 28 are both spaced apart from and parallel with the input shaft 12, the output shaft 14 and the interconnecting shafts 22, 24. The output shaft 14, the interconnecting shafts 22, 24 and the countershafts 26, 28 are supported by a plurality of support members including a first housing member 27, a second housing member 29, and a third housing member 31. The housing members 27, 29, 31 are fitted with bearings 33 for rotatably supporting the output shaft 14, the first and second interconnecting shafts 22, 24, and the countershafts 26, 28. In the embodiment provided, housing member 27 is disposed closest to the torque converter 16 and the final drive unit 18. Housing member 29 is disposed between housing member 27 and housing member 31.

A dual clutch 30 is connected between input shaft 12 and the first and second interconnecting shafts 22, 24. The dual clutch 30 includes a clutch housing 32 connected for common rotation with input shaft 12. Further, the dual clutch 30 has first and second clutch elements or hubs 34 and 36. The clutch elements 34 and 36 together with the housing 32 are configured to form a friction clutch, as well known in the art as a dual clutch. More specifically, the clutch elements 34, 36 and the clutch housing 32 have friction plates 35 mounted thereon that interact to form a friction clutch. Further, the clutch element 34 is connected for common rotation with the first interconnecting shaft 22 and the clutch element 36 is connected for common rotation with the second interconnecting shaft 24. Thus, selective engagement of the clutch element 34 with the clutch housing 32 connects the input shaft 12 for common rotation with first interconnecting shaft 22 and selective engagement of the clutch element 36 with the clutch housing 32 connects the input shaft 12 for common rotation with second interconnecting shaft 24.

The countershaft gearing arrangement 20 also includes a plurality of co-planar, intermeshing gear sets 40, 50, 60, 70, and 80. In the embodiment provided, the gear sets 40, 50, 60, and 70 are disposed between housing member 27 and housing member 29 and gear set 80 is disposed between housing member 29 and housing member 31.

Co-planar gear set 40 includes gear 42, gear 44, and gear 46. Gear 42 is connected for common rotation with the second interconnecting shaft 24 and intermeshes with gear 44 and gear 46. Gear 44 is selectively connectable for common rotation with the first countershaft 26. Gear 46 is selectively connectable for common rotation with the second countershaft 28. Gear set 40 is located adjacent housing member 27.

Co-planar gear set 50 includes gear 52, gear 54, and gear 56. Gear 52 is connected for common rotation with the second interconnecting shaft 24 and intermeshes with gear 54 and gear 56. Gear 54 is selectively connectable for common rotation with the first countershaft 26. Gear 56 is selectively connectable for common rotation with the second countershaft 28. Gear set 50 is located adjacent gear set 40.

Co-planar gear set 60 includes gear 62, gear 64, and gear 66. Gear 62 is connected for common rotation with the first interconnecting shaft 22 and intermeshes with gear 66. Gear 66 is selectively connectable for common rotation with the second countershaft 28. Gear 64 is selectively connectable for common rotation with the first countershaft 26 and is also intermeshed with gear 66. Gear set 60 is located adjacent gear set 50.

Co-planar gear set 70 includes gear 72, gear 74, and gear 76. Gear 72 is connected for common rotation with the first interconnecting shaft 22 and intermeshes with gear 74 and gear 76. Gear 74 is selectively connectable with the first countershaft 26. Gear 76 is selectively connectable with the second countershaft 28. Gear set 70 is located between gear set 60 and housing member 29.

Co-planar or transfer gear set 80 includes gear 82, gear 84, and gear 86. Gear 82 is connected for common rotation with the first countershaft 26 and intermeshes with gear 86. Gear 86 is connected for common rotation with the output member 14. Gear 84 is selectively connectable for common rotation with the second countershaft 28 and is also intermeshed with gear 86. Gear set 80 is located between housing member 29 and housing member 31.

The transmission 10 further includes a plurality of selectively engageable synchronizer assemblies 110, 112, 114, and 116. Synchronizers 110, 112, 114, and 116 generally include a shift fork (not shown) that is bi-directionally translated by an actuator (not shown) into at least two engaged positions and a neutral or disengaged position. For example, synchronizer 110 is selectively engageable to connect gear 44 with the first countershaft 26 for common rotation therewith and is selectively engageable to connect gear 54 with the first countershaft 26 for common rotation therewith. Synchronizer 112 is selectively engageable to connect gear 46 with the second countershaft 28 for common rotation therewith and is selectively engageable to connect gear 56 with the second countershaft 28 for common rotation therewith. Synchronizer 114 is selectively engageable to connect gear 64 with the first countershaft 26 for common rotation therewith and is selectively engageable to connect gear 74 with the first countershaft 26 for common rotation therewith. Synchronizer 116 is selectively engageable to connect gear 66 with the second countershaft 28 for common rotation therewith and is selectively engageable to connect gear 76 with the second countershaft 28 for common rotation therewith.

The transmission 10 is capable of transmitting torque from the input shaft 12 to the output shaft 14 in at least seven forward torque ratios and one reverse torque ratio. Each of the forward torque ratios and the reverse torque ratio is attained by engagement of the dual clutch 30 and one of the clutch elements 34, 36 and one or more of the synchronizer assemblies 110, 112, 114, and 116. Those skilled in the art will readily understand that a different speed ratio is associated with each torque ratio.

For example, to establish the reverse torque ratio, clutch element 34 of the dual clutch 30 is engaged and synchronizer 114 is engaged to couple gear 64 to the first countershaft 26. By this engagement, clutch element 34 of the dual clutch 30 transfers torque from the input shaft 12 through clutch housing 32 to the first interconnecting shaft 22. Further, torque is transferred from the first interconnecting shaft 22 through gear 62 to gear 66. Gear 66 transfers the torque to gear 64. Upon engagement of synchronizer 114, gear 66 transfers torque to the first countershaft 26. The first countershaft 26 transfers the torque to gear 82. Gear 82 transfers the torque to gear 86, which in turn transfers the torque to output shaft 14. Output shaft 14 transfers the torque to the final drive unit 18.

To establish a first forward torque ratio (i.e. a 1st gear), clutch element 36 of the dual clutch 30 is engaged and synchronizer 110 is engaged to couple gear 54 to the first countershaft 26. By this engagement, clutch element 36 of the dual clutch 30 transfers torque from the input shaft 12 through clutch housing 32 to the second interconnecting shaft 24. Further, torque is transferred from the second interconnecting shaft 24 through gear 52 to gear 54. Upon engagement of synchronizer 110, gear 54 transfers torque to the first countershaft 26. The first countershaft 26 transfers the torque to gear 82. Gear 82 transfers the torque to gear 86, which in turn transfers the torque to output shaft 14. Output shaft 14 transfers the torque to the final drive unit 18.

To establish a second forward torque ratio (i.e. a 2nd gear), clutch element 34 of the dual clutch 30 is engaged and synchronizer 116 is engaged to couple gear 66 to the second countershaft 28. By this engagement, clutch element 34 of the dual clutch 30 transfers torque from the input shaft 12 through clutch housing 32 to the first interconnecting shaft 22. Further, torque is transferred from the first interconnecting shaft 22 through gear 62 to gear 66. Upon engagement of synchronizer 116, gear 66 transfers torque to the second countershaft 28. The second countershaft 28 transfers the torque to gear 84. Gear 84 transfers the torque to gear 86, which in turn transfers the torque to output shaft 14. Output shaft 14 transfers the torque to the final drive unit 18.

To establish a third forward torque ratio (i.e. a 3rd gear), clutch element 36 of the dual clutch 30 is engaged and synchronizer 112 is engaged to couple gear 56 to the second countershaft 28. By this engagement, clutch element 36 of the dual clutch 30 transfers torque from the input shaft 12 through clutch housing 32 to the second interconnecting shaft 24. Further, torque is transferred from the second interconnecting shaft 24 through gear 52 to gear 56. Upon engagement of synchronizer 112, gear 56 transfers torque to the second countershaft 28. The second countershaft 28 transfers the torque to gear 84. Gear 84 transfers the torque to gear 86, which in turn transfers the torque to output shaft 14. Output shaft 14 transfers the torque to the final drive unit 18.

To establish a fourth forward torque ratio (i.e. a 4th gear), clutch element 34 of the dual clutch 30 is engaged and synchronizer 114 is engaged to couple gear 74 to the first countershaft 26. By this engagement, clutch element 34 of the dual clutch 30 transfers torque from the input shaft 12 through clutch housing 32 to the first interconnecting shaft 22. Further, torque is transferred from the first interconnecting shaft 22 through gear 72 to gear 74. Upon engagement of synchronizer 114, gear 74 transfers torque to the first countershaft 26. The first countershaft 26 transfers the torque to gear 82. Gear 82 transfers the torque to gear 86, which in turn transfers the torque to output shaft 14. Output shaft 14 transfers the torque to the final drive unit 18.

To establish a fifth forward torque ratio (i.e. a 5th gear), clutch element 36 of the dual clutch 30 is engaged and synchronizer 110 is engaged to couple gear 44 to the first countershaft 26. By this engagement, clutch element 36 of the dual clutch 30 transfers torque from the input shaft 12 through clutch housing 32 to the second interconnecting shaft 24. Further, torque is transferred from the second interconnecting shaft 24 through gear 42 to gear 44. Upon engagement of synchronizer 110, gear 44 transfers torque to the first countershaft 26. The first countershaft 26 transfers the torque to gear 82. Gear 82 transfers the torque to gear 86, which in turn transfers the torque to output shaft 14. Output shaft 14 transfers the torque to the final drive unit 18.

To establish a sixth forward torque ratio (i.e. a 6th gear), clutch element 34 of the dual clutch 30 is engaged and synchronizer 116 is engaged to couple gear 76 to the second countershaft 28. By this engagement, clutch element 34 of the dual clutch 30 transfers torque from the input shaft 12 through clutch housing 32 to the first interconnecting shaft 22. Further, torque is transferred from the first interconnecting shaft 22 through gear 72 to gear 76. Upon engagement of synchronizer 116, gear 76 transfers torque to the second countershaft 28. The second countershaft 28 transfers the torque to gear 84. Gear 84 transfers the torque to gear 86, which in turn transfers the torque to output shaft 14. Output shaft 14 transfers the torque to the final drive unit 18.

To establish a seventh forward torque ratio (i.e. a 7th gear), clutch element 36 of the dual clutch 30 is engaged and synchronizer 112 is engaged to couple gear 46 to the second countershaft 28. By this engagement, clutch element 36 of the dual clutch 30 transfers torque from the input shaft 12 through clutch housing 32 to the second interconnecting shaft 24. Further, torque is transferred from the second interconnecting shaft 24 through gear 42 to gear 46. Upon engagement of synchronizer 112, gear 46 transfers torque to the second countershaft 28. The second countershaft 28 transfers the torque to gear 84. Gear 84 transfers the torque to gear 86, which in turn transfers the torque to output shaft 14. Output shaft 14 transfers the torque to the final drive unit 18.

The present invention contemplates that a variety of torque ratios (i.e., the ratio of torque of the output member 14 to the input member 12) are achievable through the selection of tooth counts of the gears of the transmission 10. Moreover, the present invention advantageously provides the transfer gears 82, 84 and 86 in a single plane. This arrangement provides the opportunity to achieve reduced transmission length in comparison with double plane transfer gears.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member;
   an output member;
   a first, second, third, fourth, and fifth gear set each having a first gear, a second gear, and a third gear wherein the output member is continuously connected with one of the gear sets;
   a first interconnecting member continuously connected to the third and fourth gear sets;
   a second interconnecting member continuously connected with the first and second gear sets;
   a first countershaft continuously connected to the fifth gear set;
   a second countershaft continuously connected to the fifth gear set;
   a dual clutch assembly selectively engageable to interconnect the input member with one of the first interconnecting member and the second interconnecting member; and
   four synchronizer assemblies each selectively coupling one of the first, second, third, and fourth gear sets with at least one of the first interconnecting member, the second interconnecting member, the first countershaft, and the second countershaft, and
   wherein the dual clutch assembly and four synchronizer assemblies are selectively engageable in combinations of at least two to establish at least seven forward speed ratios and at least one reverse speed ratio between the input member and the output member and wherein the first gear, second gear, and third gear within each of the first, second, third, fourth, and fifth gear sets are co-planar.

2. The transmission of claim 1 wherein the first countershaft and the second countershaft are each located radially outward from and parallel to the input member.

3. The transmission of claim 2 wherein the output member is located radially outward from and parallel to the input member.

4. The transmission of claim 3 wherein the first interconnecting member is concentric with the second interconnecting member.

5. The transmission of claim 1 wherein the dual clutch assembly includes a first clutch for selectively connecting the input member with the first interconnecting member and a second clutch for selectively connecting the input member with the second interconnecting member.

6. The transmission of claim 1 wherein the output member is continuously connected with the fifth gear set.

7. The transmission of claim 1 wherein the first gears of the first and second gear sets are connected to the second interconnecting member, the first gears of the third and fourth gear sets are connected to the first interconnecting member, the second gears of the first, second, third, and fourth gear sets are connectable to the first countershaft, and the third gears of the first, second, third, and fourth gear sets are connectable to the second countershaft.

8. The transmission of claim 7 wherein the first pear of each of the first, second, and fourth gear sets are intermeshed with the second gear and third gear of each of the first, second, and fourth gear sets, respectively, and wherein the second gear of the third gear set is intermeshed with the first gear and the third gear of the third gear set.

9. The transmission of claim 8 wherein the first gear of the fifth gear set is connected to the first countershaft, the second gear of the fifth gear set is connected to the second countershaft, and the third gear of the fifth gear set is connected to the output member.

10. The transmission of claim 9 wherein the second gear of the fifth gear set is intermeshed with the first gear and the third gear of the fifth gear set.

11. The transmission of claim 1 wherein a first of the four synchronizer assemblies selectively connects one of the first gear set and the second gear set to the first countershaft.

12. The transmission of claim 11 wherein a second of the four synchronizer assemblies selectively connects one of the first gear set and the second gear set to the second countershaft.

13. The transmission of claim 12 wherein a third of the four synchronizer assemblies selectively connects one of the third gear set and the fourth gear set to the first countershaft.

14. The transmission of claim 13 wherein a fourth of the four synchronizer assemblies selectively connects one of the third gear set and the fourth gear set to the second countershaft.

15. The transmission of claim 1 wherein the first gear set is adjacent the dual clutch assembly, the second gear set is adjacent the first gear set, the third gear set is adjacent the second gear set, the fourth gear set is adjacent the third gear set, and the fifth gear set is adjacent the fourth gear set.

16. A transmission comprising:
   an input member;

an output member;

a first, second, third, fourth, and fifth gear set each having a first gear, a second gear, and a third gear wherein the output member is continuously connected with one of the gear sets;

a first interconnecting member continuously connected to the third and fourth gear sets;

a second interconnecting member continuously connected with the first and second gear sets;

a first countershaft continuously connected to the fifth gear set;

a second countershaft continuously connected to the fifth gear set;

a dual clutch assembly selectively engageable to interconnect the input member with one of the first interconnecting member and the second interconnecting member;

a first synchronizer assembly selectively engageable to interconnect at least one of the first gear set and the second gear set to the first countershaft;

a second synchronizer assembly selectively engageable to interconnect at least one of the first gear set and the second gear set to the second countershaft;

a third synchronizer assembly selectively engageable to interconnect one of the third gear set and the fourth gear set to the first countershaft; and a fourth synchronizer assembly selectively engageable to interconnect one of the third gear set and the fourth gear set to the second countershaft, wherein the dual clutch assembly and four synchronizer assemblies are selectively engageable in combinations of at least two to establish at least seven forward speed ratios and at least one reverse speed ratio between the input member and the output member and wherein the first gear, second gear, and third gear within each of the first, second, third, fourth, and fifth gear sets are co-planar.

17. The transmission of claim 16 wherein the output member is continuously connected with the fifth gear set.

18. The transmission of claim 17 wherein the first gear, second gear, and third gear within each of the first, second, third, fourth, and fifth gear sets are co-planar, wherein the first gears of the first, second, third, and fourth gear sets are connected to one of the first interconnecting member and the second interconnecting member, the second gears of the first, second, third, and fourth gear sets are connectable to the first countershaft, and the third gears of the first, second, third, and fourth gear sets are connectable to the second countershaft, wherein the first gears of the first, second, and fourth gear sets are intermeshed with the second gears and third gears of the first, second, and fourth gear sets, and wherein the second gear of the third gear set is intermeshed with the first gear and the third gear of the third gear set, wherein the first gear of the fifth gear set is connected to the first countershaft, the second gear of the fifth gear set is connected to the second countershaft, and the third gear of the fifth gear set is connected to the output member, and wherein the second gear of the fifth gear set is intermeshed with the first gear and the third gear of the fifth gear set.

19. The transmission of claim 17 wherein the first gear set is adjacent the dual clutch assembly, the second gear set is adjacent the first gear set, the third gear set is adjacent the second gear set, the fourth gear set is adjacent the third gear set, and the fifth gear set is adjacent the fourth gear set.

20. A transmission comprising:

an input member;

an output member;

a first, second, third, fourth, and fifth gear set each having a first gear, a second gear, and a third gear wherein the output member is continuously connected with the fifth gear set;

a first interconnecting member continuously connected to the third and fourth gear sets;

a second interconnecting member continuously connected with the first and second gear sets;

a first countershaft continuously connected to the fifth gear set;

a second countershaft continuously connected to the fifth gear set;

a dual clutch assembly selectively engageable to interconnect the input member with one of the first interconnecting member and the second interconnecting member;

a first synchronizer assembly selectively engageable to interconnect at least one of the first gear set and the second gear set to the first countershaft;

a second synchronizer assembly selectively engageable to interconnect at least one of the first gear set and the second gear set to the second countershaft;

a third synchronizer assembly selectively engageable to interconnect one of the third gear set and the fourth gear set to the first countershaft; and a fourth synchronizer assembly selectively engageable to interconnect one of the third gear set and the fourth gear set to the second countershaft, wherein the first gear set is adjacent the dual clutch assembly, the second gear set is adjacent the first gear set, the third gear set is adjacent the second gear set, the fourth gear set is adjacent the third gear set, and the fifth gear set is adjacent the fourth gear set, and wherein the dual clutch assembly and four synchronizer assemblies are selectively engageable in combinations of at least two to establish at least seven forward speed ratios and at least one reverse speed ratio between the input member and the output member.

* * * * *